United States Patent [19]
Koyama

[11] Patent Number: 6,021,764
[45] Date of Patent: Feb. 8, 2000

[54] AIR INTAKE STRUCTURE FOR AN ENGINE WITH A SUPERCHARGER

[75] Inventor: Hideo Koyama, Shizuoka-ken, Japan

[73] Assignee: Suzuki Motor Corporation, Shizuoka-ken, Japan

[21] Appl. No.: 09/012,762

[22] Filed: Jan. 23, 1998

[51] Int. Cl.[7] .................................................. F02B 33/00
[52] U.S. Cl. ............................................ 123/563; 60/599
[58] Field of Search ................................ 123/559.1, 563; 60/599, 605.1

*Primary Examiner*—Noah P. Kamen
*Attorney, Agent, or Firm*—Flynn, Thiel, Boutell & Tanis, P.C.

[57] ABSTRACT

An engine with a supercharger has a first intake pipe with one end connected to an air cleaner at one end of the engine. The intake pipe extends toward the other end of the engine and joins with an intermediate portion which is bent to extend across the engine and is then bent downward and connected to a supercharger arranged on the exhaust side of the engine. A second intake pipe has one end connected to the supercharger and the other end extended upward and connected to an intercooler disposed above the engine. A third intake pipe has one end connected to the intercooler and the other end extended in such a manner as to pass above the first intake pipe for connection to a throttle body on the intake side of the engine.

7 Claims, 5 Drawing Sheets

AIR INTAKE STRUCTURE FOR AN ENGINE WITH A SUPERCHARGER

FIELD OF THE INVENTION

The present invention relates to an air intake structure of an engine with a supercharger, and more specifically to an air intake structure of a supercharged engine where the air intake layout is simplified, the engine is made compact, the engine response is improved, the support rigidity of an intercooler is increased, and a layout of an air bypass pipe and an air bypass valve is easily performed.

BACKGROUND OF THE INVENTION

Engines to be mounted on vehicles include a natural air intake type engine for taking in air due to the pressure difference between the inside and the outside of the combustion chamber, and an engine with a supercharger where intake air is forced into the combustion chamber.

Figure 7:
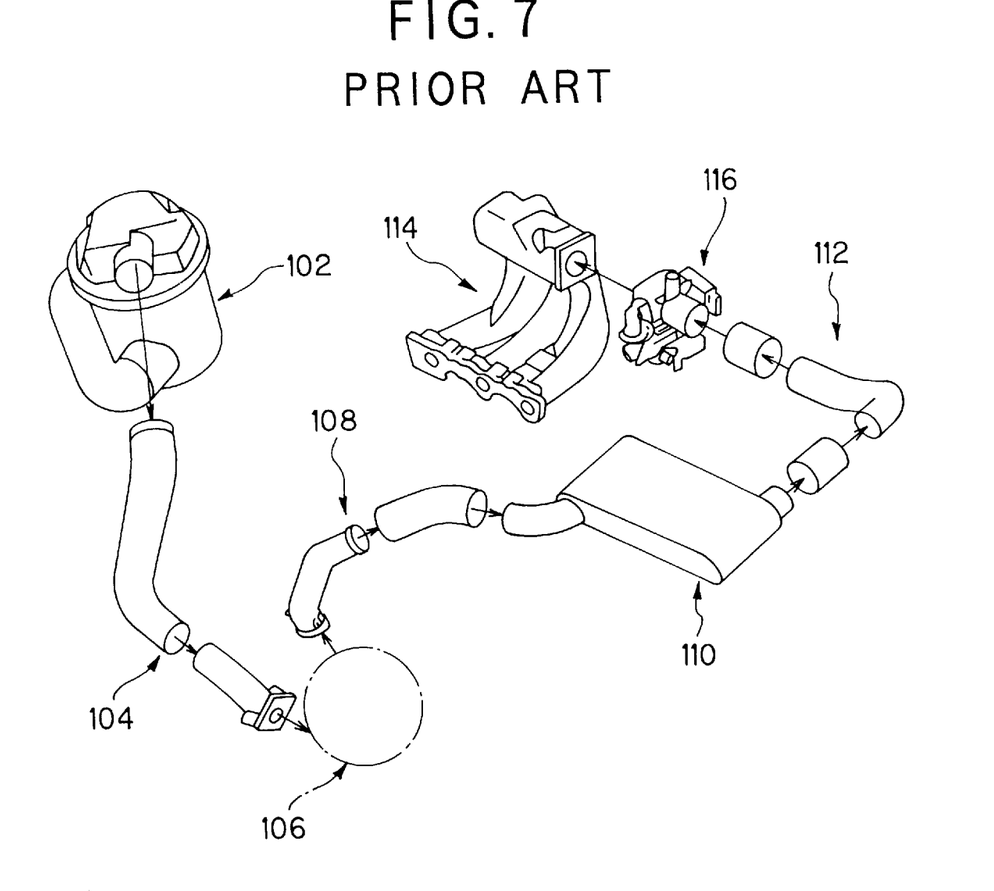
FIG. 7 is an exploded perspective view of a conventional air intake structure of a supercharged engine.

The engine with a supercharger is conventionally provided with an air intake structure as shown in FIG. 7. The intake structure includes an air cleaner 102 and a first intake pipe 104 with one end thereof connected to the air cleaner. The other end of the first intake pipe 104 is connected to a supercharger 106, which connects to an exhaust manifold (not shown) arranged at the exhaust side of the engine. One end of a second intake pipe 108 is connected to the supercharger 106. The other end of the second intake pipe 108 is connected to an intercooler 110. One end of a third intake pipe 112 is connected to the intercooler 110. The other end of the third intake pipe 112 is connected to a throttle body 116 which connects to an intake manifold 114 arranged at the intake side of the engine.

In the known air intake structure of FIG. 7, the second intake pipe 108, the intercooler 110 and the third intake pipe 112 are arranged in such a manner as to take a long way (i.e., a long path or distance) around the engine from the supercharger 106 arranged on the exhaust side of the engine to the throttle body 116 arranged on the opposite, i.e. intake side of the engine. Since the intake pipes 108 and 112 define a long distance around the engine from the supercharger 106 to the throttle body 116, there are disadvantages in that the intake layout is complicated, the compact configuration of the engine is obstructed, and the engine response during a transient state is deteriorated due to the long path length from the supercharger 106 to the throttle body 116.

Also, in the air intake structure shown in FIG. 7, there is a further problem in that the intercooler 110 does not have much structural support and may be moved or loosened by engine vibration. In order to increase the support rigidity of the intercooler 110, an intercooler support member (not shown) must be installed and supported on the engine side. This is a disadvantage in that the cost is increased due to increasing the number of parts and the number of assembling processes.

SUMMARY OF THE INVENTION

To eliminate or minimize the disadvantages described above, the present invention is characterized in that an engine with a supercharger has a first intake pipe with one end connected to an air cleaner located toward a second end of a crank axis, and the other end extended toward a first end of a crank axis on the upper side of the engine, and with an intermediate portion bent and then extended downward and connected to a supercharger arranged at the exhaust side of the engine; a second intake pipe with one end connected to the supercharger and with the other end extended upward and connected to an intercooler arranged on the upper side of the engine; and a third intake pipe with one end connected to the intercooler and with the other end extended in such a manner as to pass above an upper side of the first intake pipe and be connected to a throttle body led to an intake manifold arranged on an intake side of the engine.

The engine with a supercharger is characterized in that the second intake pipe, the intercooler and the third intake pipe are arranged substantially linearly in such a manner as to connect between the supercharger and the throttle body, and that the first intake pipe and the second intake pipe are arranged such that the first intake pipe lower part extends downward and the second intake pipe upper part extends upward and are nearly parallel with each other.

In the air intake structure of the present invention, since the third intake pipe connecting the intercooler with the throttle body is arranged in such a manner as to pass above the upper side of the first intake pipe connecting the air cleaner with the supercharger, these intake pipes do not define a lengthy arrangement as in the prior art, but can be arranged compactly relative to the engine due to the crossing of the first and third intake pipes.

Also, in the air intake structure of the invention, since the second intake pipe, the intercooler and the third intake pipe are arranged substantially linearly in such a manner as to connect between the supercharger and the throttle body, the path length from the supercharger to the throttle body is reduced, and since the second intake pipe and the third intake pipe can be shortened due to the reduction of the path length, the intercooler can be sufficiently supported to the supercharger and the throttle body by the shortened second and third intake pipes.

Further, in the air intake structure of the invention, since the first intake pipe lower part extends on the lower side of the first intake pipe and the second intake pipe upper part extends on the upper side of the second intake pipe, and are arranged nearly parallel with each other, an air bypass pipe and an air bypass valve have space in which they can be arranged.

DETAILED DESCRIPTION

Embodiments of the present invention will now be described based on the drawings and specifically FIGS. 1–6 which show embodiments of the present invention.

Figure 4:
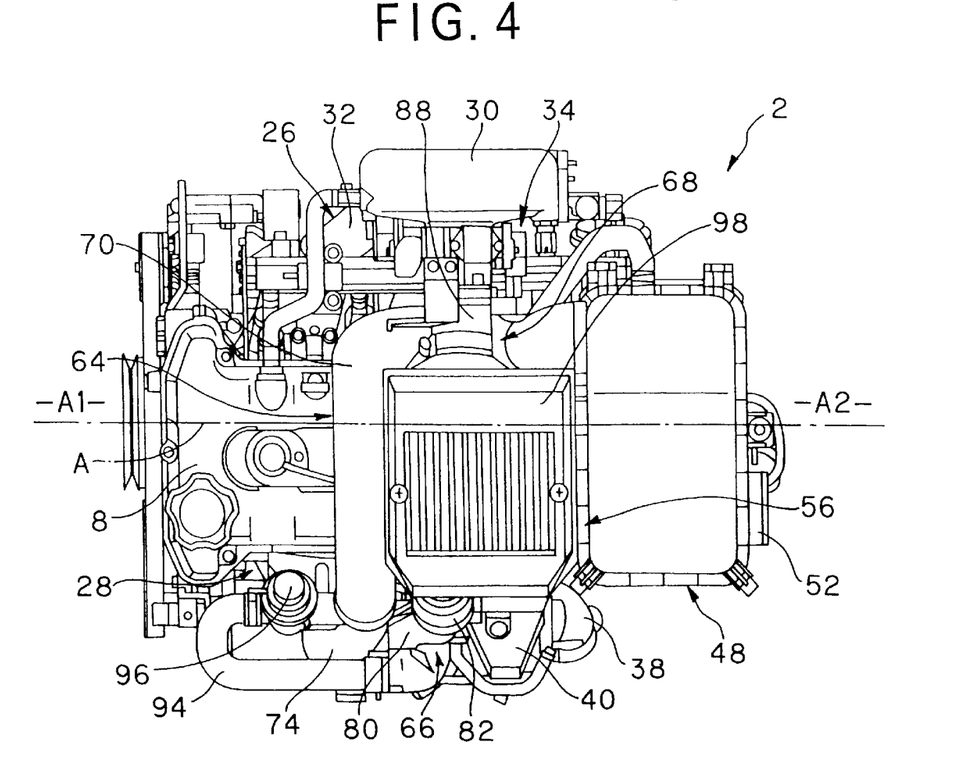
FIG. 4 is a plan view of an engine with a supercharger and showing the intake structure of the invention mounted thereon.
Figure 5:
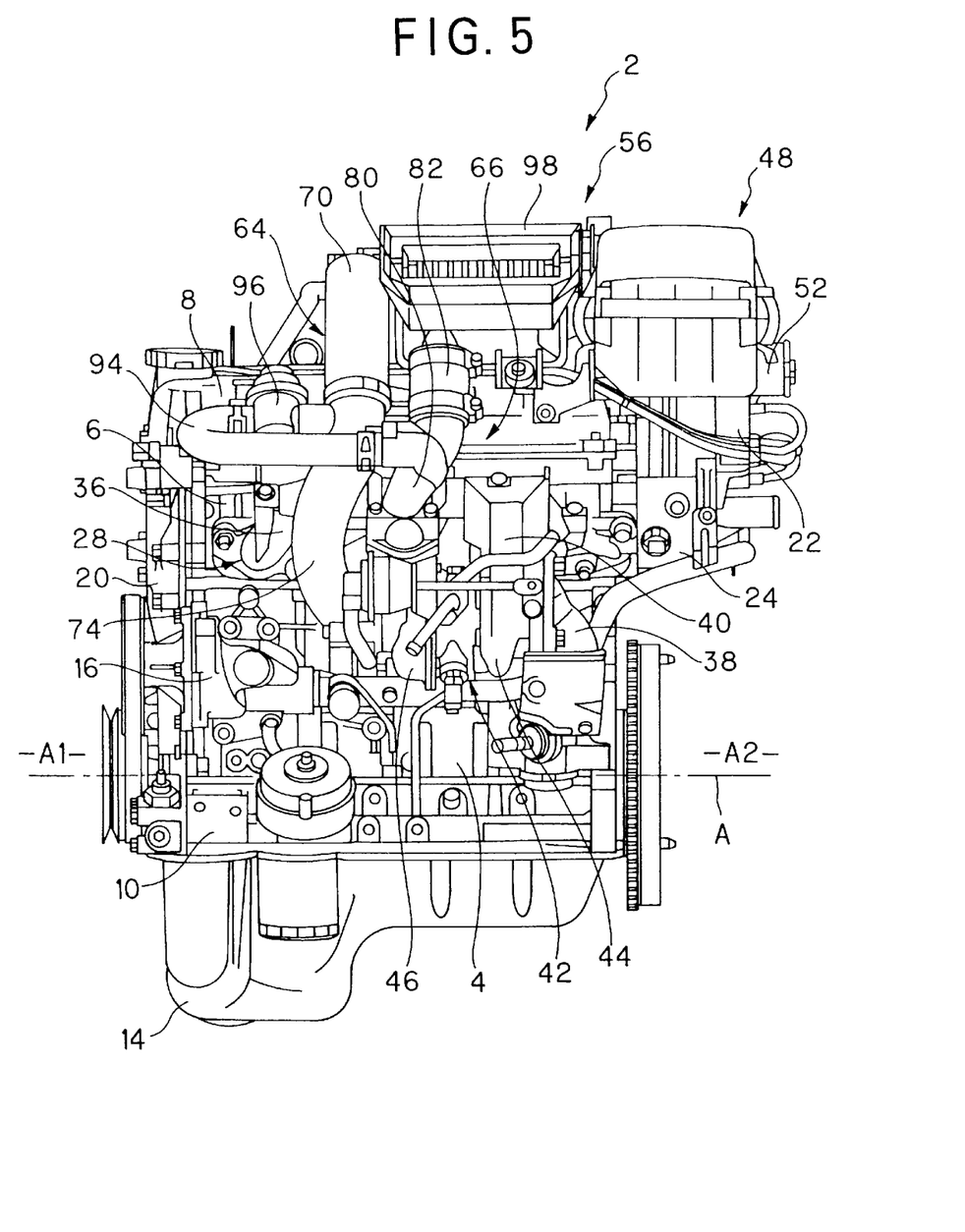
FIG. 5 is a front view of the engine of FIG. 4.
Figure 6:
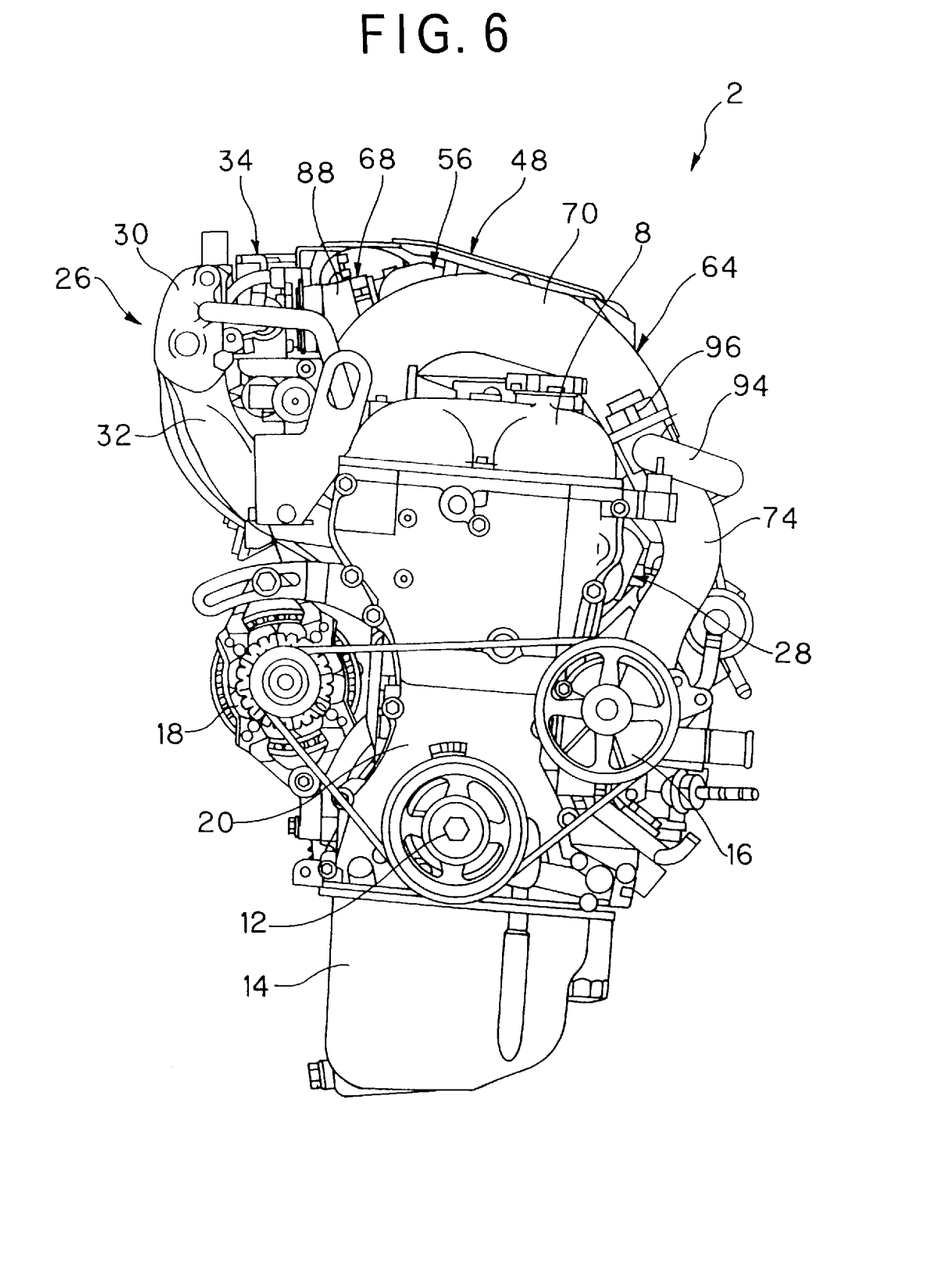
FIG. 6 is a side view of the engine of FIG. 4.

In FIGS. 4–6, numeral 2 designates an engine with a supercharger, which engine is mounted on a vehicle (not shown) or the like. The engine 2 has a cylinder block 4, a cylinder head 6 mounted on the upper side of the cylinder block 4, a head cover 8 mounted on the cylinder head 6, a lower case 10 mounted on the lower side of the cylinder block 4 for rotatably supporting a crankshaft 12, and an oil pan 14 mounted on the lower case 10. The crankshaft 12 defines a crank axis A which extends longitudinally of the engine, which axis at opposite ends of the axis is designated A1 and A2 to facilitate reference to the opposite ends of the engine.

In the engine 2 as described above, auxiliary equipment such as a water pump 16 or an alternator 18 driven by the crankshaft 12 is provided adjacent the end A1 of crank axis A, and a timing chain (not shown) for transmitting the driving force to a valve mechanism (not shown) is also provided. Numeral 20 designates a chain cover for the timing chain. The engine 2 at its other end, i.e. at the end A2 of the crank axis A, is provided with auxiliary equipment such as a distributor 22 driven by a cam shaft (not shown) or a thermostat 24 for adjusting the temperature of a cooling water.

The engine 2 has an intake manifold 26 constituting part of an intake system mounted on the intake side of the cylinder head 6, and an exhaust manifold 28 constituting part of an exhaust system mounted on the exhaust side of the cylinder head 6.

The intake manifold 26 is provided with a surge tank 30 positioned on the upper side thereof, and a branch intake pipe 32 branching from the surge tank 30 and communicating with each intake port (not shown) of the cylinder head 6 on the lower side. A throttle body 34 is connected to the surge tank 30. The throttle body 34 is arranged for directing the intake air flow in a direction which intersects the direction of the crank axis A.

The exhaust manifold 28 is provided with a branch exhaust pipe 36 communicating with each exhaust port (not shown) of the cylinder head 6, and the lower downstream end of each branch exhaust pipe 36 is gathered and joined to one exhaust pipe 38. The exhaust manifold 28 is covered with a heat shielding plate 40.

A conventional supercharger 42 is provided generally midway of the exhaust pipe 38. The supercharger 42 has a turbine part 44 and a compressor part 46. The turbine part 44 is provided generally midway of the exhaust pipe 38.

Figure 1:
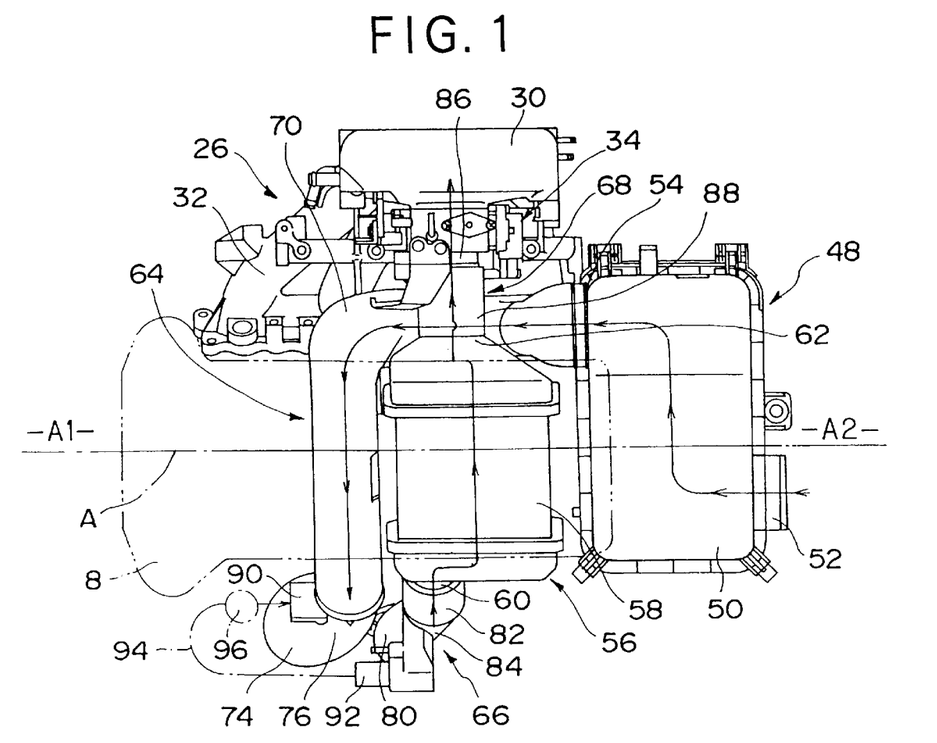
FIG. 1 is a plan view of an air intake structure for an engine with a supercharger and showing an embodiment of the invention, the details of the engine being omitted for purposes of illustration.
Figure 2:
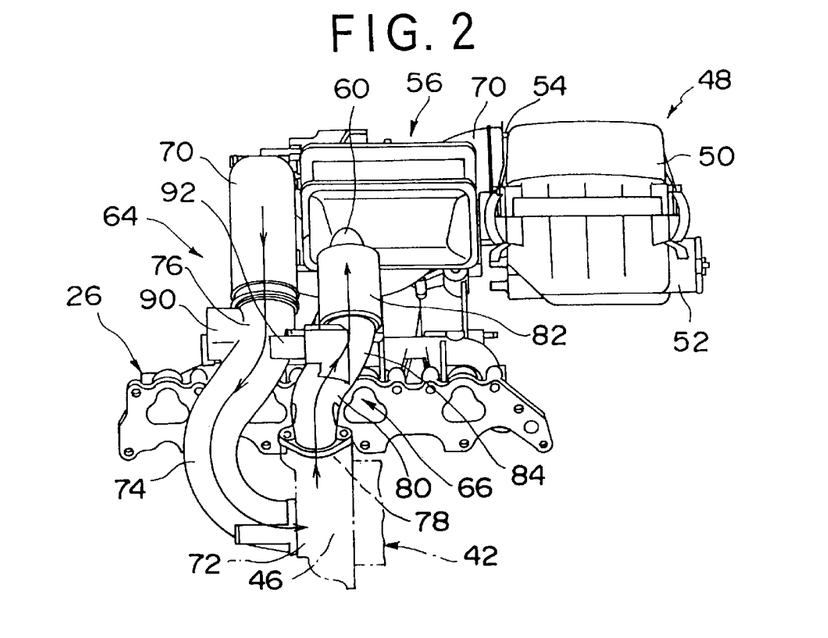
FIG. 2 is a front view of FIG. 1.
Figure 3:
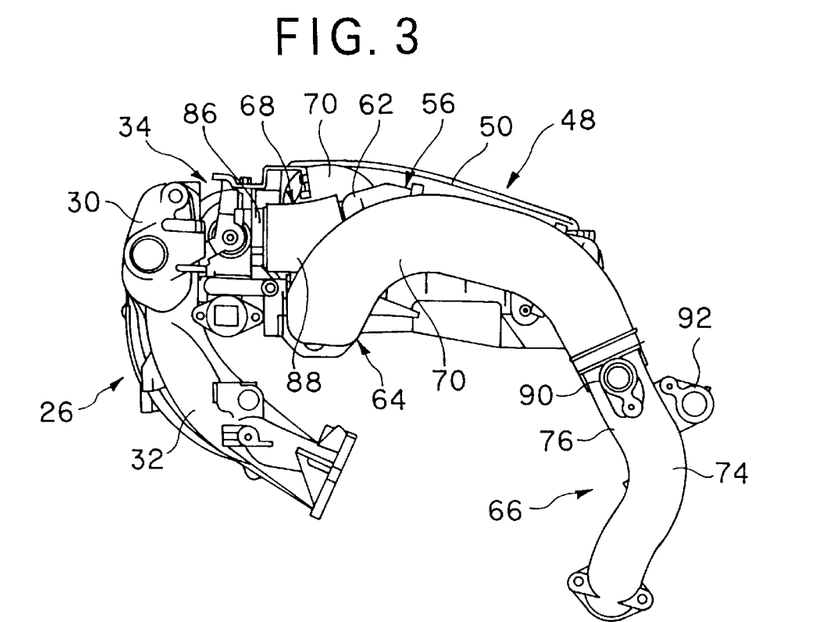
FIG. 3 is a side view of the air intake structure of FIG. 1.

In the supercharged engine 2 and as shown in greater detail in FIGS. 1–3, an air cleaner 48 is arranged at the end A2 of the engine on the upper side of the head cover 8. The air cleaner 48 contains a filter element (not shown) in a cleaner case part 50, and is provided with an air inlet port 52 and an air supply port 65. Also, an intercooler 56 is arranged on the upper side of the head cover 8 at an intermediate position between the ends A1 and A2 of the engine. The intercooler 56 is arranged for directing the intake air flow along a direction which crosses or intersects the crank axis A direction. The intercooler has a cooler inlet part 60 and a cooler outlet part 62 provided on the upstream side and downstream side of the cooler housing 58, respectively.

The air cleaner 48 and the compressor part 46 of the supercharger 42 are connected by a first intake pipe 64. The compressor part 46 of the supercharger 42 and the intercooler 56 are connected by a second intake pipe 66. The intercooler 56 and the throttle body 34 are connected by a third intake pipe 68.

The first intake pipe 64 has an air cleaner outlet pipe 70 with one end connected to the supply port 54 of the air cleaner 48 and the other end connected to an end of supercharging inlet pipe 74. The other end of inlet pipe 74 is connected to an inlet part 72 of the compressor part 46.

The air cleaner outlet pipe 70 has one end portion directed toward the end A2 of the engine and connected to the air cleaner 48. This end portion extends away from the air cleaner toward the end A2 of the engine, and joins to an intermediate portion of pipe 70 which is bent toward the exhaust side of the engine and extends in such a manner as to be parallel with the transverse direction of the intercooler 56. This intermediate portion of pipe 70 is then bent downward and extends along the exhaust side of the engine. The supercharger inlet pipe 74 has one end directed upward and connected to the lower discharge end of the cleaner outlet pipe 70. An intermediate portion of supercharger inlet pipe 74 is first curved toward the end A1, and is then reversely curved so as to be directed toward the other end A2, and terminates in an end part which is connected to the supercharging inlet part 72 of the compressor part 46. The supercharging inlet pipe 74 on the inlet end, has a part 76 extended upward for connection to the pipe 70.

The second intake pipe 66 includes a supercharger outlet pipe 80 with one end connected to a supercharging outlet part 78 of the compressor part 46, and a cooler inlet hose 82 with one end connected to the other end of the supercharger outlet pipe 80. The other end of cooler inlet hose 82 is connected to the inlet part 60 of the intercooler 56.

In the supercharger outlet pipe 80, one end is directed downward on the exhaust side of the engine and is connected to the supercharging outlet part 72 of the compressor part 46, and the other end is extended upward and is curved in such a manner as to be substantially parallel with the adjacent curved portion of the supercharging inlet pipe 74. The pipe 80, on the exhaust or discharge side thereof, is extended upward to form an upper part 84. The upper part 84 is arranged in such a manner as to be nearly parallel with and adjacent the pipe part 76 on the upper end of pipe 74. In the cooler inlet hose 82, one end is directed downward and connected to the supercharger outlet pipe 80, and the other end is arranged extending upward and connected to the cooler inlet part 60.

The third intake pipe 68 comprises a cooler outlet hose 88 with one end connected to the outlet part 62 of the intercooler 56, and with the other end connected to a body inlet part 86 of the throttle body 34.

In the cooler outlet hose 88, one end is directed toward the exhaust side of engine 2 and is connected to the outlet part 62 of the intercooler 56, and the other end is arranged extending toward the intake side of engine 2 in such a manner as to intersect the cleaner outlet pipe 70 and pass over the upper side thereof for connection to the body inlet part 86 of the throttle body 34.

The engine 2 with supercharger 42 has the first intake pipe 64 with one end connected to the air cleaner 48, with the pipe 64 at said one end projecting toward the other end A2 of the engine on the upper side of the head cover 8, and with the intermediate portion of the intake pipe bent and extended in parallel with the intercooler 56 and then bent and extended downwardly to the lower side of the exhaust side of the engine and connected to the compressor part 46 of the supercharger 42; the second intake pipe 66 with one end connected to the compressor part 46 of the supercharger 42 and with the other end extended upward and connected to the intercooler 56 arranged on the upper side of the head cover 8; and the third intake pipe 68 with one end connected to the intercooler 56 and with the other end extended in such a manner as to pass over the upper side of the first intake pipe 64 and connect to the throttle body 34 arranged on the intake side of the engine.

The second intake pipe 66, the intercooler 56 and the third intake pipe 68 are arranged substantially linearly in such a manner as to connect between the supercharger 42 and the throttle body 34. That is, the flow path defined by pipe 66, intercooler 56 and pipe 68 is of short distance since it does not include distortions or deflections toward the ends of the engine, but rather is disposed substantially within a plane which substantially perpendicularly intersects the longitudinal direction A of the engine, but at the same time defines a flow path from the exhaust side to the intake side of the engine. Further, the first intake pipe 64 and the second intake pipe 66 are arranged such that the first intake pipe part 76 extends downward and the second intake pipe part 84 extends upward nearly in parallel with each other, and are provided with a bypass inlet 90 and a bypass outlet 92 respectively, which are connected through an air bypass pipe 94 so as to permit bypass of the supercharger. An air bypass valve 96 is provided generally midway of the air bypass pipe 94. In addition, in FIGS. 4–6, numeral 98 designates a cooler cover of the intercooler 56.

In the engine 2, air is taken from the air cleaner 48 and is supplied to the supercharger 42 by the first intake pipe 64, and the intake air compressed by the compressor part 46 is supplied to the intercooler 56 by the second intake pipe 66 and is cooled, and is then supplied to the throttle body 34 and supplied to each combustion chamber (not shown) by the intake manifold 26.

In the air intake structure of the engine 2, since the third intake pipe 68 connecting the intercooler 56 with the throttle body 34 is arranged in such a manner so as to pass above the upper side of the first intake pipe 64 connecting the air cleaner 48 with the supercharger 42, the intake pipe 68 does not have a lengthy arrangement as in the prior art. The compact arrangement of the air intake structure on the engine is realized by the crossing of the first intake pipe 64 and the third intake pipe 68. Therefore, in the air intake structure, the intake layout can be simplified and the engine 2 can be made compact.

Also, in the intake structure of the engine 2, since the second intake pipe 66, the intercooler 56 and the third intake pipe 68 are arranged substantially linearly in such a manner as to connect between the supercharger 42 and the throttle body 34, the path length from the supercharger 42 to the throttle body 34 is reduced, and since the second intake pipe 66 and the third intake pipe 68 can be shortened due to the reduction of the path length, the intercooler 56 can be sufficiently supported to the supercharger 42 and the throttle body 34 by the shortened second intake pipe 66 and the third intake pipe 68.

Therefore, in the air intake structure, the engine response is improved due to the reduction of the path length from the supercharger 42 to the throttle body 34, and since the intercooler 56 can be supported by the shortened second intake pipe 66 and the third intake pipe 68, the structural rigidity of the intercooler 56 is increased and a separate intercooler support member (not shown) can be eliminated.

Further, in the air intake structure of the engine 2, since the first intake pipe part 76 and the second intake pipe part 84 are arranged nearly parallel with each other, the air bypass pipe 94 and the air bypass valve 96 have sufficient space in which they can be mounted.

Therefore, in the air intake structure, the layout of the air bypass pipe 94 and the air bypass valve 96 can be easily performed.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. An air intake structure for an engine with a supercharger and having an elongate crankshaft extending longitudinally thereof between first and second ends of the engine, comprising:

a first intake pipe with one end connected to an air cleaner arranged at one end of the engine, said intake pipe extending away from the air cleaner toward the other end of said engine on an upper side thereof, the intake pipe having an intermediate portion bent across and above the engine and then extended downward and connected to a supercharger arranged on the exhaust side of the engine;

a second intake pipe with one end connected to the supercharger and with the other end extended upward and connected to an intercooler arranged on an upper side of the engine; and a third intake pipe with one end connected to the intercooler and with the other end extended in such a manner as to pass across an upper side of the first intake pipe and connected to a throttle body on an intake manifold arranged on an intake side of the engine.

2. An air intake structure according to claim 1, wherein the second intake pipe, the intercooler and the third intake pipe are arranged in such a manner as to connect between the supercharger and the throttle body substantially linearly.

3. An air intake structure according to claim 1, wherein the first intake pipe and the second intake pipe are arranged such that a first intake pipe part extended downward and a second intake pipe part extended upward are arranged nearly in parallel with each other on the exhaust side of the engine.

4. An intake system according to claim 3, wherein the first intake pipe part and the second intake pipe part have an air bypass pipe connected therebetween, the air bypass pipe having an air bypass valve mounted substantially in the middle thereof.

5. In an internal combustion engine having an intake manifold mounted on one side thereon and an exhaust manifold mounted on the other side thereof, the engine being elongated generally parallel with a rotational axis of a crankshaft which is mounted on a cylinder block so that the engine extends longitudinally between first and second ends, an air intake structure associated with the engine for supplying intake air to the intake manifold, and a supercharger mounted on the engine for supercharging the air supplied through the intake system, comprising the improvement wherein:

an air cleaner is mounted above said engine adjacent one end thereof, said supercharger is mounted on said engine adjacent the exhaust side thereof, an intercooler is mounted above said engine intermediate the ends thereof, a throttle housing is mounted to said intake manifold on the intake side of the engine, a first intake pipe includes a first end portion which connects to the air cleaner and extends above the engine in a direction toward the other end of the engine, said first end portion being disposed adjacent the intake side of the engine and being joined through a bend to an intermediate portion which extends transversely across the top of the engine and which joins through a further bend to a second end portion which projects downwardly along the exhaust side of the engine for connection to an intake of the supercharger, a second intake pipe which connects to an outlet of the supercharger and projects upwardly along the exhaust side of the engine for connection to an intake of the intercooler, said intake of the intercooler being disposed generally adjacent the exhaust side of the engine, and a third intake pipe which connects to a discharge of the intercooler, said discharge being disposed generally adjacent the intake side of the engine, said third intake pipe projecting sidewardly so as to be disposed above and cross said first end portion of said first intake pipe and being connected to said throttle body.

6. An engine according to claim 5, wherein said second end portion of said first intake pipe terminates in a bend which defines an end part which projects generally toward said one end of said engine and which is connected to the intake of the supercharger.

7. An engine according to claim 5, wherein the second intake pipe, the intercooler and the third intake pipe are all disposed substantially within or closely adjacent a plane which extends in generally perpendicular relation with respect to the rotational axis of the engine so as to minimize the flow distance from the supercharger to the throttle body.

* * * * *

UNITED STATES PATENT AND TRADEMARK OFFICE
CERTIFICATE OF CORRECTION

PATENT NO.     : 6,021,764
DATED          : February 8, 2000
INVENTOR(S)    : Hideo Koyama Page 1 of 1

It is certified that error appears in the above-identified patent and that said Letters Patent is hereby corrected as shown below:

Title page
Insert -- [30] Foreign Application Priority Data
      Jan. 31, 1997 [JP] Japan ............... 9-32874 --.

Signed and Sealed this

Twenty-eighth Day of August, 2001

*Attest:*

NICHOLAS P. GODICI
*Attesting Officer*    Acting Director of the United States Patent and Trademark Office